United States Patent [19]

Yalpani

[11] Patent Number: 4,683,298
[45] Date of Patent: Jul. 28, 1987

[54] PROCESS FOR THE PREPARATION OF AMINATED POLYSACCHARIDE DERIVATIVES

[75] Inventor: Manssur Yalpani, Montreal, Canada

[73] Assignee: British Columbia Research Council, Vancouver, Canada

[21] Appl. No.: 832,462

[22] Filed: Feb. 21, 1986

Related U.S. Application Data

[63] Continuation-in-part of Ser. No. 690,664, Jan. 10, 1985, abandoned.

[51] Int. Cl.$^4$ .................. C08B 31/00; C08B 31/08; C08B 37/00; C08B 37/02
[52] U.S. Cl. ............................. 536/45; 536/18.7; 536/30; 536/32; 536/49; 536/51; 536/52
[58] Field of Search ............... 536/45, 18.7, 30, 32, 536/51, 52, 49

[56] References Cited

U.S. PATENT DOCUMENTS

| | | | |
|---|---|---|---|
| 2,621,174 | 12/1952 | Gaver et al. | 536/51 |
| 3,064,313 | 11/1962 | Butler | 18/57 |
| 3,280,026 | 10/1966 | McCoy, Jr. | 252/1 |
| 3,498,971 | 3/1970 | Blaga et al. | 536/98 |
| 3,567,360 | 3/1971 | Pierce, Jr. et al. | 8/116.2 |
| 3,574,188 | 4/1971 | Takehara et al. | 536/98 |
| 4,124,758 | 11/1978 | Watts et al. | 536/30 |
| 4,362,720 | 12/1982 | Lemieux et al. | 536/18.7 |

FOREIGN PATENT DOCUMENTS

899859 5/1972 Canada .

OTHER PUBLICATIONS

Synthesis of Mono- and Di-Aminated Starches, by T. Teshirogi et al, pp. 89–95, T-479, Sen-I Gahkaishi, vol. 35, No. 11 (1979).

N. Polukhina, L. S. Gal'braikh, and Z. A. Rogovin, (Vysokomolekul. Soedin, B11, 270, 1969).

N. Kholmuradov, Yu, S. Kozlova, L. S. Gal'braikh, and Z. A. Rogorin (Vysokomolekul. Soedin., 8, 1089, 1966).

Synthesis of Selectively Modified Cellulose derivatives via Reductive Amination of 2-Oxy- and 3-Oxy-Cellulose Intermediate, Manssur Yalpani and Laurence D. Hall; and J. DeFaye & Andree Gadelle; pp. 260–262, Can. J. Chem., vol. 62, 1984.

Synthesis of 2-Amino-2-Deoxycellulose by Takuma Teshirogo, Hideo Yamamoto, Munenori Sakamoto and Koroaki Tonami, vol. 36, No. 11 (1980) Sen-I-Gakkaishi, pp. T-501-T-505.

Homopolysaccharides Interaction with the Dimethyl Sulphoxide-Paraformaldehyde Cellulose Solvent System, Selected Oxidation of Amylose and Cellulose at Secondary Alcohol Groups by Claude Bosso, Jacques Defaye, Andree Gadelle, and Chuan Choan Wong, J. Chem. Soc., Perkin Trans., I, 1982, pp. 1579-1585.

"Amination of Amylose at the C-2 Position" by Wolfrom & Wang (Carboyhd. Res.), 12 (1970), 109–114.

"Amino Derivatives of Starches, Amination of 6-0-Tritylamylose" by Wolfrom, Kato, Taha, Sato, Yuen, Kinoshita and Soltes (J. Org. Chem.) 32, 3086 (1967).

"Detergents Linked to Polysaccharides; Preparation and Effects on Membranes and Cells" by Pitha, Kociolek, Caron (Eur. J. Biochem.) 94, 11–18 (1979).

"Amino Derivatives of Starches, Amination of Amylose" by Wolfrom, Taha and Horton, (J. Org. Chem.) 28, Dec. 63, 3553-3554.

"Coupling of Proteins and Other Amines to Sepharose by Bromine Oxidation and Reductive Amination" by Einarsson, Forsberg, Larm, Riquelme and Scholander (J. Chromatogr) 215, 45, 1981.

"Coupling of Proteins and Other Amines to Carbohydrate Polymers via Bromine Oxidation and Reductive Amination" by Larm and Scholander (Carbohdr. Res.) 58, 249, 1977.

*Primary Examiner*—Ronald W. Griffin
*Attorney, Agent, or Firm*—Christie, Parker & Hale

[57] ABSTRACT

A process for preparing an amino deoxy derivative of a polysaccharide. The process comprises oxidizing the polysaccharide with dimethyl sulfoxide in combination with acetic anhydride or acetic anhydride with paraformaldehyde in a first step. The product from the first step is subjected to reductive amination.

24 Claims, No Drawings ns. 4,683,298

PROCESS FOR THE PREPARATION OF AMINATED POLYSACCHARIDE DERIVATIVES

CROSS REFERENCE TO RELATED APPLICATION

This application is a continuation-in-part of U.S. patent application Ser. No. 690,664, filed Jan. 10, 1985, now abandoned.

FIELD OF THE INVENTION

This invention relates to methods for the preparation of certain derivatives of natural polysaccharides, for example, cellulose, dextran, starch, guar gum and xanthan gum.

DESCRIPTION OF THE PRIOR ART

Water soluble polysaccharides are finding increasing industrial applications based on the broad range of functional properties they exhibit, such as their capacity to modify the basic characteristics of water, e.g. by conferring viscosity, to emulsify, stabilize, suspend, flocculate, bind and coat. In many cases, improvements of these polysaccharide properties are accomplished by various chemical derivatization methods. Such methods are also employed in order to use intractable, but inexpensive polysaccharides.

For example, the conversion of insoluble cellulose or cellulose-containing materials into derivatives which are soluble in either aqueous or non-aqueous media has been of prime interest to industry for many years. Several methods are available for the preparation of water soluble cellulose derivatives, including various alkyl ether derivatives, for example methyl cellulose, ethyl cellulose, carboxymethyl cellulose, hydroxyethyl cellulose and hydroxypropyl cellulose, as exemplified by U.S. Pat. Nos. 3,064,313; 3,280,026; 3,498,971; 3,567,360; and 3,574,188.

Water soluble polysaccharide products have applications in numerous areas, including foods, textiles, paints, cosmetics and pharmaceuticals. The utility of these products in many of these applications relies on their ability to confer high viscosities to aqueous media. However, it has been shown that the viscosifying properties of cellulose alkyl ether derivatives, for example, are inadequate for certain applications, such as in mobility control applications in enhanced oil recovery. These shortcomings derive, among other things, from the methods employed in the manufacturing processes. In order to obtain water soluble products, relatively high degrees of substitution are required, and as a consequence, these processes often rely on strongly alkaline or otherwise extreme reaction conditions to achieve adequate activation of the intractable polysaccharide for subsequent chemical derivatizations. These conditions, however, commonly lead to partial or substantial degradation of the resulting products. It is therefore desirable to have available derivatization methods, which employ mild conditions, but are also sufficiently efficient to be applicable to industrial scale use.

Substantial efforts have, for example, been directed at developing methods for the selective oxidation of primary and secondary hydroxyl groups. The introduction of carbonyl groups into polysaccharides constitutes one of the most important synthetic tasks, because it affords reactive intermediates which are amenable to further modifications, such as reductive amination, epimerization via reduction, and conversion into branched derivatives. Selective oxidations are furthermore of interest in the evaluation of the stability of oxidized polysaccharides in various industrial processes, such as in the bleaching and aging of cellulosecontaining materials.

A. N. de Belder and B. J. Lindberg in Canadian Pat. No. 899,859 found that oxidation of dextran with dimethyl sulfoxide (DMSO)/acetic anhydride ($Ac_2O$) afforded products with carbonyl functions at C-2, C-3 or C-4 and degrees of oxidation of 0.03–0.3.

It has recently been observed that oxidation of cellulose can also be achieved with DMSO/$Ac_2O$. This method was used by C. Bosso, J. Defaye, A. Gadelle, C. C. Wong and C. Pederson, (J. Chem. Soc., Perkin Trans., 1, 1579, 1982) for the selective oxidation of 6-O-trityl cellulose to afford the corresponding 2-oxycellulose derivative. They also found that 3-oxy-cellulose could be obtained in yields of 60–70% without prior C-6 protection of the native polymer, using the DMSO/$Ac_2O$ oxidation system in combination with the DMSO/paraformaldehyde (PF) solvent. Detailed studies of the oxidation products showed that formaldehyde substitution occurs initially at the C-6 and C-2 positions of amylose and with increasing paraformaldehyde concentration also at C-3. While oxidation of unprotected cellulose with DMSO/$Ac_2O$/PF proceeds exclusively at position C-3, it was found that in the case of amylose some 10% oxidation at C-2 had also occurred at similar overall levels of oxidations (degree of oxidation, d.o., 0.6–0.7). For 6-O-trityl cellulose, they found a greater proportion of 2-oxy (56%) than 3-oxy (36%) products. On the other hand, oxidation occurred exclusively at C-2 for 6-O-tritylamylose, but 56% at C-2 and 30% at C-3 in the case of 6-O-acetyl amylose (d.o. 0.7).

Selectively oxidized polysaccharide derivatives are important precursors for the preparation of aminodeoxy-polysaccharide derivatives, which are of interest for a variety of applications, for example, as flocculating and metal chelating agents and in enzyme immobilization.

Other interests include the synthesis of chitin and chitosan analogues, and the preparation of reactive polymer intermediates for further derivatizations. N. Polukhina, L. S., Gal'braikh, and Z. A. Rogovin, (Vysokomolekul. Soedin, B11, 270, 1969) and N. Kholmuradov, Yu, S. Kozlova, L.S. Gal'braikh, and Z. A. Rogorin (Vysokomolekul. Soedin., 8, 1089, 1966) have reacted 2,3-anhydro derivatives of cellulose with ammonia to obtain mixed polysaccharide products with 2-amino-2-deoxy- and 3-amino-3-deoxy-substituents. A total of four types of aminosugars were identified in these products, of which two were 3-amino-3-deoxy altrose and 2-amino-2-deoxy glucose.

T. Teshirogi, H. Yamamoto, M. Sakamoto and H. Tonami, (Sen-I Gakkaishi, 36, T502, 1980) have recently reported a method for preparing 2-amino-2-deoxy-cellulose having a degree of substitution (d.s.) of 0.37. Their method is based on selective oxidation of 6-O-triphenylmethyl (trityl) cellulose to 2-oxy-6-O-triphenylmethylcellulose, conversion into the oxime by hydroxylamine hydrochloride, reduction with lithium aluminum hydride, and finally, detritylation with acid.

However, this method has a number of disadvantages, in that (i) the overall chemical yields are low; (ii) it involves five chemical steps, of which two are connected with the introduction of stable amine functions and another two steps involve acid treatment of the polymer; (iii) reduction of the oxime intermediate leads to side reactions, such as loss of amine functions due to some formation of keto functions, and polymer degradation arising from the destruction of excess reducing agent; and (iv) the applicability of the method has been demonstrated for only one type of cellulose starting material.

Similarly, M. Yalpani, L. D. Hall, J. Defaye and A. Gadelle have recently reported the preparation of 3-amino-3-deoxy-cellulose with d.s. 0.3 using regenerated cellulose as starting material. In both of these methods, the yields of amino-deoxy-cellulose were unsatisfactory, and only the more chemically reactive cellulose starting materials were employed.

Considerable efforts have also been directed at preparing amino-deoxy derivatives of starch and several other polysaccharides.

For example M. J. Wolfram, M. I. Taha, and D. Horton, (J. Org. Chem., 28, 3553, 1963) M. L. Wolfram, H. Kato, M. I. Taha, A. Sato, G. U. Yuen, T. Kinoshita, and E. J. Soltes (J. Org. Chem., 32, 3086, 1967) M. L. Wolfram and P. Y. Wang (Carbohydr. Res., 12, 109, 1970) have described the preparation of amylose aminated at secondary hydroxyl groups by (a) successive p-toluenesulfonylation, hydrazinolysis, and catalytic reduction; (b) triphenylmethylation, p-toluenesulfonylation, reaction with sodium azide, reduction, and detritylation; or (c) the same method as in (b) except for the replacement of sodium azide with hydrazine; and (d) oxidation of 6-O-tritylamylose with dimethyl sulfoxide-acetic anhydride, oximation, lithium aluminum hydride reduction and detritylation.

With the exception of method (d), all of these methods resulted in the formation of mixtures of 2-amino-2-deoxy- and 3-amino-3-deoxy- products, as well as 6-amino-6-deoxy-amylose and diamino-dideoxy products (for method (a)). The chemical yields (d.s.) varied from 45% to 140% and were only acceptable for method (d). All of the methods were tedious and not suitable for large scale applications.

Similarly, T. Teshirogi, H. Yamamoto, M. Sakamoto, and H. Tonami (Sen-I Gakkaishi, 35, T-479, 1979) have described a synthesis of mainly C-6 aminated starch, involving p-toluene sulfonylation, reaction with sodium azide, acetylation, and lithium aluminum hydride reduction. Although the product was highly substituted (d.s. 0.92), the yields were low (14%) as a result of depolymerization reactions.

O. Larm and E. Scholander (Carbohydr. Res., 58, 249, 1977) M. Einarsson, B. Forsberg, O. Larm, M. E. Riquelme, and E. Scholander (J. Chromatogr., 215, 45, 1981) have described an alternative method for the amination of polysaccharides. Carbonyl groups were introduced by mild bromine oxidation and subsequently converted to stable amines via reductive amination using sodium cyanoborohydride, or by methoxylation and reduction. Among the disadvantages of this method are (a) only relatively low levels of oxidation can be obtained without simultaneous polymer degradation; (b) substantial amounts of carboxyl groups are introduced in addition to the carbonyl functions; and (c) the reported overall incorporation of amines is not high.

Another important area of industrial application of polysaccharides is based on their use as detergents. A number of bacterial polysaccharides have lipophilic substituents which confer emulsifying properties. For example the product commercially available under the trade mark Emulsan has fatty acid ester groups, mainly 2- and 3-hydroxydodecanoic acid esters, attached to a polymeric backbone consisting of galactosamine and aminouronic acid residues. It is desirable to modify the surfactant properties of such products by preparing analogues whose lipophilic moieties can be readily altered by chemical methods. J. Pitha, K. Kociolek, and M. G. Caron, (Eur. J. Biochem, 94, 11, 1979) have attached the detergents available under the trade mark Triton X-100 via ether linkages to insulin, dextran, amylose, and cellulose, yielding compounds containing 5–30% (w/w) detergent residues.

SUMMARY OF THE INVENTION

This invention seeks to develop procedures for the preparation of new types of amino deoxy polysaccharides by selective oxidation and reductive amination. The invention seeks to prepare polysaccharide derivatives bearing lipophilic moieties for use as surfactants and to use mild reaction conditions in order to maintain the molecular integrity of the final products.

Thus, according to the invention, a process is provided for the preparation of oxidized and aminated polysaccharides. Oxidation of secondary hydroxyl functions of polysaccharides is accomplished with acetic anhydride-dimethyl sulfoxide reagent with or without paraformaldehyde. The oxidized polysaccharides are subsequently converted to aminated or amine-containing derivatives by reductive amination. Sodium cyanoborohydride or catalytic hydrogenation may, for example, be used for the reductive amination.

More specifically, reactive carbonyl functions are introduced into polysaccharides by oxidation with acetic anhydride and dimethyl sulfoxide. For the case of cellulose and starch, selective oxidations of hydroxyl functions at either C-2 or C-3 are accomplished using acetic anhydride and dimethyl sulfoxide as the oxidant and either 6-O-triphenylmethyl ether derivatives or a mixture of paraformaldehyde and unprotected polymers, respectively. In the latter case, the cellulose starting material can be derived from a variety of sources and pretreatments, for example, regenerated cellulose or cellulose obtained from wood pulp. For the preparation of 6-O-triphenylmethyl cellulose, regenerated cellulose is preferred. For the preparation of C-2 or C-3 aminated polysaccharide derivatives from the corresponding oxyderivatives, any ammonium salt or primary or secondary amine-containing reagent can be employed with ammonium acetate, ammonium chloride, hydrazine, or ethylenediamine being preferred. For the preparation of lipophilic polysaccharide derivatives, any fatty acid amine, aldehyde, or ketone derivative can be employed, where the amine reagents can be directly condensed with oxidized polysaccharide, and the other reagents with aminated intermediates. The fatty acid reagents may be selected from $C_4$ to $C_{22}$ isomers, from unsaturated or otherwise functionalized derivatives, with dodecyl to octadecyl derivatives being preferred. Amino acid derivatives of polysaccharides may be derived from the condensation of oxidized polysaccharides and any amino acid, or amino acid oligomer or polymer, with aliphatic amino acids being preferred. Any reducing agent which reduces imines in the presence of carbonyl functions can be used. Examples include sodium cyanoborohydride and catalytic hydrogenation.

For the derivatization of the oxidized polysaccharides, any aqueous or polar organic solvent or mixtures thereof can be employed, with water (at neutral pH) or aqueous alcohol, ethyl alcohol, dimethyl sulfoxide or dimethyl formamide being preferred. The reaction temperatures can vary between 20°–90° C., but should preferably not exceed 60° C. Similarly, the conversion of the oxypolysaccharides or amino-polysaccharide derivatives into branched derivatives can be performed using reductive amination and reductive alkylation, respectively. In the former case, any amino sugar, for example, glucosamine, galactosamine, maltosamine and streptomycin, or products obtained by amination of carbohydrates, may be employed.

For the reductive alkylation of aminopolysaccharides derivatives any aldose or ketose, or other carbonyl-containing saccharide may be employed, with aldoses and ketoses being preferred.

Thus, in a first aspect, the invention is a process for preparing an amino deoxy derivative of a polysaccharide, the process comprising (a) oxidizing the polysaccharide with dimethyl sulfoxide in combination with a reagent selected from (i) acetic anhydride and (ii) acetic anhydride with paraformaldehyde; and (b) subjecting the product from (a) to reductive amination.

The reductive amination may use sodium cyanoborohydride or catalytic hydrogenation.

In a second aspect, the invention is a polysaccharide derivative having the general formula (polysaccharide-$CH_2$)-R, where (polysaccharide-$CH_2$) is the derivatised polysaccharide containing a methylene function in its repeating carbohydrate unit, and R is a group selected from —NHR'; —NR' and NH—$CH_2$—R where R is derived from a hydrophobic alkyl residue, an aliphatic residue, an amino acid, and a mono-, di- or oligo- saccharide.

The following Examples illustrate the invention:

EXAMPLE 1

Amino deoxy Starch

Soluble starch (5.3 g) was dispersed in dimethyl sulfoxide (100 mL) and treated with acetic anhydride (20 mL) at ambient temperature for 16h. Addition of methanol (500 mL) and then dichloromethane (500 mL) led to the formation of a white precipitate which was collected by filtration, washed with methanol (300 mL) and dried. A portion of the oxidized, undried starch (2.0 g) was reductively aminated with ammonium acetate (5.5 g) and sodium cyanoborohydride (2.0 g) in water (75 mL, pH 7) for 4 days at 40° C. The resulting amino deoxy starch product had a N-content of 0.49%.

EXAMPLE 2

N-(2-Amino-2-deoxy-glucose)-Deoxy Starch

Oxidized, wet starch (1.2 g) obtained as described in Example 1, was reductively aminated with glucosamine (4.0 g) and $NaCNBH_3$ (2.0 g) in water (75 mL) for 4 days at 40° C. The N-(2-amino-2-deoxy-glucose)-deoxy starch product had a N-content of 3.15%.

EXAMPLE 3

3-Amino-3-deoxy-starch

Potato Starch (5.0 g) dispersed in warm DMSO (100 mL), was treated with paraformaldehyde (5.5 g) at 85° C. for several hours, cooled to room temperature, and then oxidized using $Ac_2O$ (50 mL) at 70°–80° C. for 18h. The product was precipitated by addition of aqueous methanol (0.6L), filtered, washed with methanol (0.4L), and dried to give slightly coloured product. A portion of the oxidized material (3.2 g) was reductively aminated with $NH_4OAc$ (3.8 g) and $NaCNBH_3$ (2.0 g) for 3 days at room temperature. The 3-amino-3-deoxy starch product was isolated by precipitation with methanol, washed with methanol and dried, and had a N-content of 0.87%.

EXAMPLE 4

3-Amino-3-Deoxy-Starch

Potato starch (5.5 g) was oxidized as described in the previous Example 3, except that the reaction was conducted in the dark. The oxy-starch product could be precipitated with diethylether (0.5L) but not with MeOH or $CHCl_3$, and was obtained as white material after filtration and washing (ether). A sample of this material (1.0 g) was reductively aminated as described in Example 3, yielding a product with N-content of 2.07% (after dialysis) corresponding to a degree of substitution (d.s.) of ca 0.2.

EXAMPLE 5

3-Amino-3-Deoxy-Starch

Soluble starch (10.7 g) dissolved in DMSO (100 mL) was treated with paraformaldehyde (17.8 g) at 100° C. for 2h. The reaction mixture was cooled to room temperature and treated with $Ac_2O$ (60 mL) for 18h at room temperature. The 3-oxy-product was precipitated with iso-propanol, washed with alcohol and dried (7.5 g). Samples (1.1g) of the oxidized material were reductively aminated with $NH_4OAc$ (3.7 g) and $NaCNBH_3$ (2.8 g) in DMSO (100 mL) for 4 days at room temperature, affording, after dialysis, products with N-content of 0.50%.

EXAMPLE 6

3-Amino-3-Deoxy-Starch

More 3-oxy starch was produced as described in Example 5. This was dissolved along with ammonium acetate in DMSO and Raney nickel added. After exchanging air in the vessel for hydrogen the hydrogen pressure was maintained at 2 atmospheres while the contents were stirred at room temperature for 3 hours. The reaction mixture supernatant was then dialysed against tap water for 2 days. After freeze drying, the non dialysable product had a N-content of 0.50%.

EXAMPLE 7

Amino Deoxy Dextran

To dextran (Mw 70,000, 5.0 g) in DMSO (0.1L) was added paraformaldehyde (6.3 g) and the mixture heated to 85° C. for 3h. After cooling to room temperature, the reaction mixture was treated with $Ac_2O$ (50 mL) for 18h at 70°–80° C. The oxy-dextran product was precipitated with aqueous methanol, filtered, washed and dried. A sample (1.1 g) of this material was reductively aminated with $NH_4OAc$ (3.5 g) and $NaCNBH_3$ (2.0 g) for 3 days at room temperature and the amino deoxy product was precipitated from solution by addition of methanol. The N-content was 1.46%.

EXAMPLE 8

Amino Deoxy Xanthan Gum

Commercial xanthan gum (5.0 g) was dispersed in warm (50° C.) DMSO (0.1 L) and then treated with paraformaldehyde (7.0 g) at 90° C. for 1h. The cooled reaction mixture was treated with $Ac_2O$ (50 mL) at 20°

C. in the dark for 18h and the oxidized gum was precipitated from the resulting light brown solution by addition of MeOH. The precipitate was collected, washed with MeOH and ether, affording a light yellow material. A sample (0.9 g) of this material was reductively aminated using NH$_4$OAc (3.6 g) and NaCNBH$_3$ (2.0 g) in water (0.1 L) for 3 days at 20° C. to afford the aminated product with N-content of 1.88%, corresponding to a d.s. value of ca. 1.0.

EXAMPLE 9

N-(I-Deoxy-glucit-1-yl)-Amino Deoxy Xanthan Gum

A sample of amino deoxy xanthan gum (0.5 g), obtained as described in the previous Example 7 with 1.85% N-content, was reductively alkylated in water (0.1 L) using D-glucose (1.7 g) and NaCNBH$_3$ (1.5 g) for 4 days at 25° C. The resulting viscous solution was dialyzed for 2 days, and lyophilized to afford the glycosylated product with a N-content of 0.85%.

EXAMPLE 10

N-(Glycine)-Deoxy Xanthan Gum

A sample of oxidized xanthan gum (1.0 g) obtained as described in Example 7, was treated with glycine (1.0 g) and NaCNBH$_3$ (1.8 g) in water (0.1L) for 4 days at 25° C. The resulting viscous solution was dialyzed for 2 days, and lyophilized to afford the N-glycine derivative (0.6 g) with N-content of 0.83%.

EXAMPLE 11

Amino Deoxy Guar Gum

A sample of purified guar gum (2.0 g) in DMSO (50 mL) was treated with paraformaldehyde (4.3 g) at 90° C. for 1h. The resulting viscous solution wa treated with Ac$_2$O (25 mL) in the dark at 25° C. for 18h. The product obtained by precipitation (MeOH), washing (MeOH) and drying was a slightly yellow material. A sample of this material (1.2 g) was reductively aminated with NH$_4$OAc (3.8 g) and NaCNBH$_3$ (2.0 g) in water for 3 days at 25° C. to afford, after the usual work-up, the amino deoxy product with N-conent of 1.51%, corresponding to d.s. of ca. 0.20.

EXAMPLE 12

Amino Deoxy Xanthan Gum

Xanthan gum (5.0 g) dissolved in DMSO (100 mL) was treated with paraformaldehyde (7.1 g) at 100° C. for 1h, cooled to room temperature and then oxidized with Ac$_2$O (30 mL) for 18h. The product was precipitated with iso-propanol, washed and dried. A portion (1.1 g) of this material was aminated in water with NH$_4$OAc (4.1 g) and NaCNBH$_3$ (3.0 g) in the presence of NiCl$_2$ (0.9 g) for 7 days at room temperature. The resulting aminated product was dialyzed and lyophilized (0.8 g) and had a N-content of 4.36%. A product obtained under the same conditions without the above paraformaldehyde treatment had a N-content of 1.56%.

EXAMPLE 13

N-Lysine-Deoxy Xanthan Gum Derivative

A sample (2.3 g) of oxidized xanthan gum obtained by paraformaldehyde treatment as in Example 12, was reductively aminated with lysine hydrochloride (1.5 g), NaCNBH$_3$ (3.0 g) in the presence of NiCl$_2$ (0.8 g) and KHCO$_3$ (0.7 g) for 7 days. The resulting dialyzed product (0.6 g) had a N-content of 1.03–2.84%.

EXAMPLE 14

N-(2-Amino-2-deoxy-glucose) Deoxy Xanthan Gum Derivative

A sample (1.0 g) of oxidized xanthan gum obtained as described in Example 12, was reductively aminated with an aqueous solution of glucosamine hydrochloride (3.6 g), KHCO$_3$ (1.5 g), NaCNBH$_3$ (2.3 g), NiCl$_2$ (0.5 g) for 7 days. The product was precipitated with iso-propanol and had a N-content of 1.64%.

EXAMPLE 15

Amino Deoxy Pullulan Derivative

A sample of pullulan (5.3 g) in DMSO (125 mL) was treated with paraformaldehyde (5.9 g) for 2h at 100° C., cooled to room temperature and oxidized with Ac$_2$O (60 mL) for 18h. The product was dialyzed and dried. A portion (1.6 g) was reductively aminated with NH$_4$OAc (3.2 g) and NaCNBH3 (1.8 g) in DMSO (100 mL) for 4 days at 20° C. The dialyzed product had a N-content of 2.37%. The same procedure without the paraformaldehyde treatment gave products with N-contents of 1.83%.

EXAMPLE 16

3-N-(Octadecylamino)-3-Deoxy Cellulose

A sample of regenerated cellulose (5.0 g) in DMSO (200 mL) was treated with paraformaldehyde (10.2 g) at 90° C. for 3h, then heated to 125° C. for 1 h. The resulting clear solution was oxidized with Ac$_2$O (60 mL) at 40° C. for 18h in the dark. A portion of the resulting 3-oxy-cellulose (1.0 g) dissolved in DMSO (200 mL), was treated with octadecylamine hydrochloride (2.3 g) and NaCNBH$_3$ (2.1 g) for 7 days at 25° C., affording a product with N-contents of 3.01%.

EXAMPLE 17

Amino Deoxy Starch

Soluble starch (6.0 g) was dispersed in DMSO (100 mL) and treated with Ac$_2$O (45 mL) at 60° C. for 45h. The product was precipitated with water (600 mL) yielding 5.5 g of yellow oxy-starch. A sample of oxy-starch (0.5 g) dissolved in DMSO (50 mL) was treated with NH$_4$OAc (2.7 g) and NaCNBH$_3$ (1.9 g) for 4 days at 25° C. The yellow amino starch derivative had a N-content of 3.26%.

While the selectivity of the two oxidation procedures has, with the exception of cellulose and starch, not yet been determined for other polysaccharides, this fact does not limit the scope of the methods disclosed here. It can also be noted, that higher degrees of substitution were obtained in some cases, when the oxidations were conducted in the presence of paraformaldehyde.

I claim:

1. A process for preparing an amino deoxy derivative of starch, the process comprising:
    (a) oxidizing the starch with dimethyl sulfoxide in combination with a reagent selected from (i) acetic anhydride and (ii) acetic anhydride with paraformaldehyde; and
    (b) subjecting the product from (a) to reductive amination.

2. A process as claimed in claim 1 in which the reductive amination is carried out with a reagent selected from an ammonium salt, a primary amine and a secondary amine.

3. A process as claimed in claim 2 in which the reagent is ammonium acetate.

4. A process as claimed in claim 2 in which the reagent is selected from ammonium chloride, hydrazine and ethylene diamine.

5. A process as claimed in claim 2 in which the reagent is an amino sugar.

6. A process as claimed in claim 5 in which the amino sugar is selected from glucosamine, galactosamine, maltosamine, streptomycin and products obtained by amination of carbohydrates.

7. A process as claimed in claim 1 in which the reductive amination uses a reagent able to reduce an amine in the presence of the carbonyl group.

8. A process as claimed in claim 7 in which the reagent is sodium cyanoborohydride.

9. A process as claimed in claim 7 in which the reagent is hydrogen, acting in the presence of a catalyst.

10. A process as claimed in claim 2 including a further step of reductive amination using an aldehyde or carbonyl containing reagent.

11. A process as claimed in claim 10 in which the aldehyde or carbonyl containing reagent is a carbohydrate.

12. A process as claimed in claim 11 in which the carbohydrate is an aldose or a ketose.

13. A process as claimed in claim 1 in which the reaction is carried out in a solvent selected from water, aqueous alcohol, ethanol, dimethyl sulfoxide and dimethyl formamide.

14. A process as claimed in claim 1 carried out as a temperature in the range 20° to 90° C.

15. A process as claimed in claim 14 in which the temperature does not exceed 60° C.

16. A process as claimed in claim 1 for preparing amino deoxy starch that comprises reacting starch with dimethyl sulfoxide, and acetic anhydride, and reacting the product with ammonium acetate and sodium cyanoborohydride.

17. A process as claimed in claim 1 for preparing N-(2-amino-2-deoxy-glucose)-deoxy starch that comprises reacting starch with dimethyl sulfoxide and acetic anhydride and reacting the product with glucosamine and sodium cyanoborohydride.

18. A process as claimed in claim 1 for preparing 3-amino-3-deoxy-starch that comprises reacting starch with dimethyl sulfoxide, paraformaldehyde and acetic anhydride and reacting the product with ammonium acetate and sodium cyanoborohydride.

19. A starch derivative having the general formula $$(\text{starch-CH}_2)-R$$

where
(starch-$CH_2$) *is a starch derivative containing a methylene fucntion in its repeating carbohydrate unit, and*

R is a group selected from —NHR'; —NR' and NH—CH$_2$—R' where R' is derived from a hydrophobic alkyl residue, an aliphatic residue, an amino acid, and a mono-, di-, or oligo-saccharide.

20. A starch derivative as claimed in claim 19 in which R' is an aldose or ketose attached via the aldehyde or keto carbon atom.

21. A starch derivative as claimed in claim 19 in which R' is an aldose or ketone residue attached via the carboxyl carbon atom.

22. A starch derivative as claimed in claim 19 in which R is a residue of a fatty acid amine, aldehyde or ketone.

23. A starch derivative as claimed in claim 22 in which the fatty acid compound is derived from the C4 to C22 isomer.

24. A starch derivative as claimed in claim 23 in which the fatty acid reagent is selected from derivatives in the range dodecyl to octadecyl.

* * * * *